(12) United States Patent
Kanayama

(10) Patent No.: US 6,314,341 B1
(45) Date of Patent: Nov. 6, 2001

(54) METHOD OF RECORDING TRAJECTORY DATA AND SENSOR DATA FOR A MANUALLY-DRIVEN VEHICLE

(76) Inventor: Yutaka John Kanayama, 22813 Ordonez Dr., Salinas, CA (US) 93908-1033

(*) Notice: Subject to any disclaimer, the term of this patent is extended or adjusted under 35 U.S.C. 154(b) by 0 days.

(21) Appl. No.: 09/449,797

(22) Filed: Nov. 26, 1999

(51) Int. Cl.[7] ................ G05D 1/00; G05D 3/00
(52) U.S. Cl. .......... 701/1; 701/2; 701/4; 701/5; 700/1; 700/245; 700/251; 700/254; 700/258; 700/262; 700/275; 318/139; 318/489; 318/587; 180/167; 180/168; 180/169
(58) Field of Search ............ 700/245, 251–254, 700/258, 262, 275; 701/1, 2, 5, 4; 318/587, 139, 489; 180/168, 169, 167

(56) References Cited

U.S. PATENT DOCUMENTS

| | | | |
|---|---|---|---|
| 4,816,998 | * 3/1989 | Ahlbom et al. | 364/324.02 |
| 5,109,340 | * 4/1992 | Kanayama | 364/424.02 |
| 5,170,352 | * 12/1992 | McTamaney et al. | 364/424.02 |
| 5,219,036 | * 6/1993 | Schwager et al. | 180/168 |
| 5,233,526 | * 8/1993 | Detriche et al. | 364/424.02 |
| 5,473,233 | * 12/1995 | Stull et al. | 318/587 |
| 5,621,291 | * 4/1997 | Lee | 318/568.16 |
| 5,680,306 | * 10/1997 | Shin et al. | 364/424.02 |
| 5,739,657 | * 4/1998 | Takayama et al. | 318/587 |
| 6,108,597 | * 8/2000 | Kirchner et al. | 701/23 |
| 6,124,694 | * 9/2000 | Bancroft et al. | 318/587 |
| 6,134,486 | * 10/2000 | Kanayama | 701/23 |
| 6,138,064 | * 10/2000 | Matsumoto et al. | 701/23 |

OTHER PUBLICATIONS

Y. Kanayama and G. W. Krahn, "Theory of Two–Dimensional Transformations," IEEE Transactions on Robotics and Automation, vol. 14, No. 5, PP. 827–834, 1998.

Sole Inventor: Yutaka John Kanayama Title: A Robot and Method of Control for an Autonomous Vehicle to Track a Path Consisting of Directed Straight line and Circles with Positional Feedback and Continuous Curvature.

* cited by examiner

Primary Examiner—William A. Cuchlinski, Jr.
Assistant Examiner—Ronnie Mancho

(57) ABSTRACT

A method of recording trajectory data and sensor data for a vehicle while it is manually driven. The trajectory data comprises of the trajectory length and vehicle frame (position and orientation) that are calculated at each motion execution interval. The sensor data comprises of the trajectory length, vehicle frame, sensor frame, and sensor data that are obtained at each sensor execution interval. In particular, if the sensor is a range-finder, an estimated frame of the object that the range finder detects will be added to said sensor data. One objective of this invention is to play back the same motion the vehicle was taught by a human operator. Another objective is to generate a world map for the vehicle. Still further objective is, in the play-back mode, to correct vehicle's positional errors using the sensor data.

3 Claims, 9 Drawing Sheets

METHOD OF RECORDING TRAJECTORY DATA AND SENSOR DATA FOR A MANUALLY-DRIVEN VEHICLE

BACKGROUND OF THE INVENTION

This invention pertains to a vehicle, specifically to computing and storing its trajectory data and sensor data for a manually-driven vehicle. This invention falls into the Classification Definitions of 701/002 and 701/025.

Wheeled unmanned vehicles are widely adopted in manufacturing, services, and other industries. For instance, in manufacturing factories, they are used for unmanned material handling tasks. In semiconductor clean rooms, unmanned vehicles with articulated manipulators are widely used for silicon cassette handling to eliminate human operators who may produce unwelcome dust. Some hospitals use meal-delivering vehicles for cost-saving measures.

Heretofore, two methods have been known to navigate unmanned vehicles: an electrical/optical method and a programming method. The electrical/optical navigation method uses inductive wires or optical tapes pasted on the floor that are tracked by a vehicle. Another method is navigating a vehicle by computer programming.

U.S. Pat. No. 4,816,998 described a method for a self-pivoting vehicle of computing a steering angle signal by dead reckoning from a predetermined desired trajectory for the vehicle.

U.S. Pat. No. 5,109,340 describes a method for an autonomous vehicle of planning smooth paths by using Clothoid curves that has the feature of curvature continuity.

U.S. Pat. No. 5,170,352 describes a method for an autonomous vehicle of detecting obstacles and detecting the target areas of which the vehicle to be directed. The vehicle is supposed to operate within a predetermined physical area such as on the deck of an aircraft carrier.

U.S. Pat. No. 5,219,036 describes a method for an unmanned industrial trucks of guiding themselves using reference points embedded in the floor and a path-tracking algorithm.

U.S. Pat. No. 5,233,526 describes a method for a driverless vehicle of relocking on a theoretical trajectory during the passage of the vehicle by modifying its curvature. This method guarantees that the curve has the curvature-continuity.

U.S. Pat. No. 5,621,291 describes a method for a self-propelled robotic vacuum cleaner of controlling its motion by ultrasonic sensors.

U.S. Pat. No. 6,134,486 describes a method for a vehicle of tracking a path consisting of directed lines and circles.

U.S. Pat. No. 6,138,064 describes a method for a vehicle of branching from a main line and of merging into the main line again.

These just described navigation methods, however, suffer from a number of disadvantages: (A) As to the electrical/optical method, it is time consuming and costly to implement the wires or optical tapes in the working environment. The cost increases proportionally with its total travelling distance. Furthermore, it is also time consuming and costly to change a once implemented wire/tape because of environmental or mission modifications. In clean room applications, using wires/tapes themselves is not desirable because they may become a source of dust. (B) The programming method has problems also. Measurement of a path in the vehicle's operating environment is needed to program the vehicle. This is a time-consuming task. In some situations, an ideal path for the task cannot be defined easily by programming.

There is another problem where an unmanned vehicle is used for practical applications. A geometrical map of the vehicle environment is necessary for the vehicle's precise motion. Heretofore, there is no economical and simple method known to do this task.

BRIEF SUMMARY OF THE INVENTION

The prior art made of record cited in the previous section describe methods of controlling an autonomous vehicle by computer programs. However, this invention states a manual-controlling method of a non-autonomous vehicle.

One objective of the invention is to provide a method of recording trajectory data for a manually-driven vehicle. More specifically, the trajectory data contains the trajectory length traveled by the vehicle, vehicle frame (position and orientation), and trajectory curvature computed at each motion execution interval. This is a method of manually teaching trajectories to vehicles. Another objective of the invention is, in case a sensor is mounted on the vehicle, to provide a method of storing trajectory sensor data taken along the vehicle's manual motion at each sensor execution interval. The sensor data contains the trajectory length, vehicle frame, sensor frame, and information collected by the sensor.

An advantage of the invention is that the trajectory data contains the necessary and sufficient geometrical information (the length, position, orientation, curvature of each section of the trajectory) needed to reproduce the manually generated trajectory. The curvature is essential information to obtain better control of vehicles. Approximating each trajectory section by a circular arc or by a straight line is the best known method for vehicle odometry.

Another advantage is that any trajectory that is hard to define mathematically can be generated by the method since the vehicle trajectory is generated manually. Thus the invention solves one of the problems stated earlier that an ideal path for some task is difficult to define by a computer program.

Still further advantage of the invention is that it provides a timesaving and economical method of defining and modifying trajectories to a vehicle. For a vehicle equipped with a program implementing the invention, teaching a new trajectory can be done in a single manual driving session. Thus the invention solves another problem stated earlier that implementing and changing inductive wires or optical tapes is time consuming and costly.

Still further advantage of the invention is that it provides only spatial information of the vehicle trajectory without any timing information. This method allows more general playing back of the recorded motion, because a user can select any speed profile for a play-back motion independent of the speed profile at the teaching mode.

Still further advantage of the invention is to provide a hardware-independent method of handling the trajectory information. The invention can be applied to different vehicles with an arbitrary size and with an arbitrary wheel architecture such as differential-drive, tricycle, or car-like.

Still further advantage of this invention is to provide a straightforward method of recording on-board sensor information about the external world while the vehicle is manually-driven. This information helps the vehicle later when it reproduces the same motion for positional identification (or localization) and other purposes.

Still further advantage of this invention is to provide a straightforward method of creating a map of the world by a vehicle using an appropriate range sensor, such as a sonar. The range sensor data is an envelope of objects in the world that is scanned by the sensor. The envelope can be edited manually or by a computer program to generate a geometrical map. This method is far easier than the method of physically measuring the world by hand to generate a map. If the vehicle is operated by a person who has the knowledge of the physical characteristics of the sensor, he/she can drive the vehicle to maximize the sensor information.

Still further advantage of this invention is that the world map taken by a sensor during the teaching mode and the sensor data obtained in the play-back mode are consistent, since the sensor used in both modes are the same used at similar positions and orientations. Therefore, a localization task (or vehicle's positional error resetting) becomes easier and meaningful. If the world map had been manually made without the sensor, inherent differences between the hand-made map and the sensor data would degrade the localization task.

In this invention, an odometry method of computing the trajectory information (the trajectory length, coordinates, orientation, and curvature) for recording is stated. The method apparently is parallel to the one of computing the trajectory information of a computer-controlled vehicle as a part of the position-feedback control algorithm. However, it should be noted that in this invention the trajectory information is given by manually-controlled motions intending to be used later for the reproduction of the same motion.

DETAILED DESCRIPTION OF THE INVENTION

Therefore, the invention is related to the two functions of a manually-driven vehicle: The first function is to record a trajectory data. The second function is to record a sensor data. There are no other inventions that have similar objectives. Therefore, the invention is not an improvement of any other invention.

[1] Two Operating Modes of a Vehicle

In the invention, the vehicle has two distinct operating modes: a teaching mode and a play-back mode. In the teaching mode, its motion is driven or directed by a human, and its trajectory and sensing data are recorded by a computer program. In the play-back mode, its motion is controlled by a computer program to reproduce the motion that was recorded in the teaching mode.

[2] Manual Driving Methods

In the teaching mode, several different methods for manual driving are possible. They include:

(A) A method where a human operator physically moves the vehicle by hand(s). The motors of the vehicle must be set free so that the operator can move the vehicle with little resistance.

(B) A method where a sensor system mounted on a vehicle actively detects an object held by a human operator. For instance, a sonar system is mounted on a vehicle and detect an object that is held by a human operator. The vehicle is programmed to move so that the distance between the vehicle's front end and the object is in a predefined range and the object is in the heading orientation of the vehicle.

(C) A method where the vehicle is remotely-controlled by a human operator.

(D) The vehicle may be driven by a human operator who is riding on it.

This invention is applicable to any other methods as long as the vehicle motion is controlled or directed by a human operator in any way, because the invention is related to only the method how the resultant motion is computed and recorded.

[3] Motion-Data Computation

Figure 1:
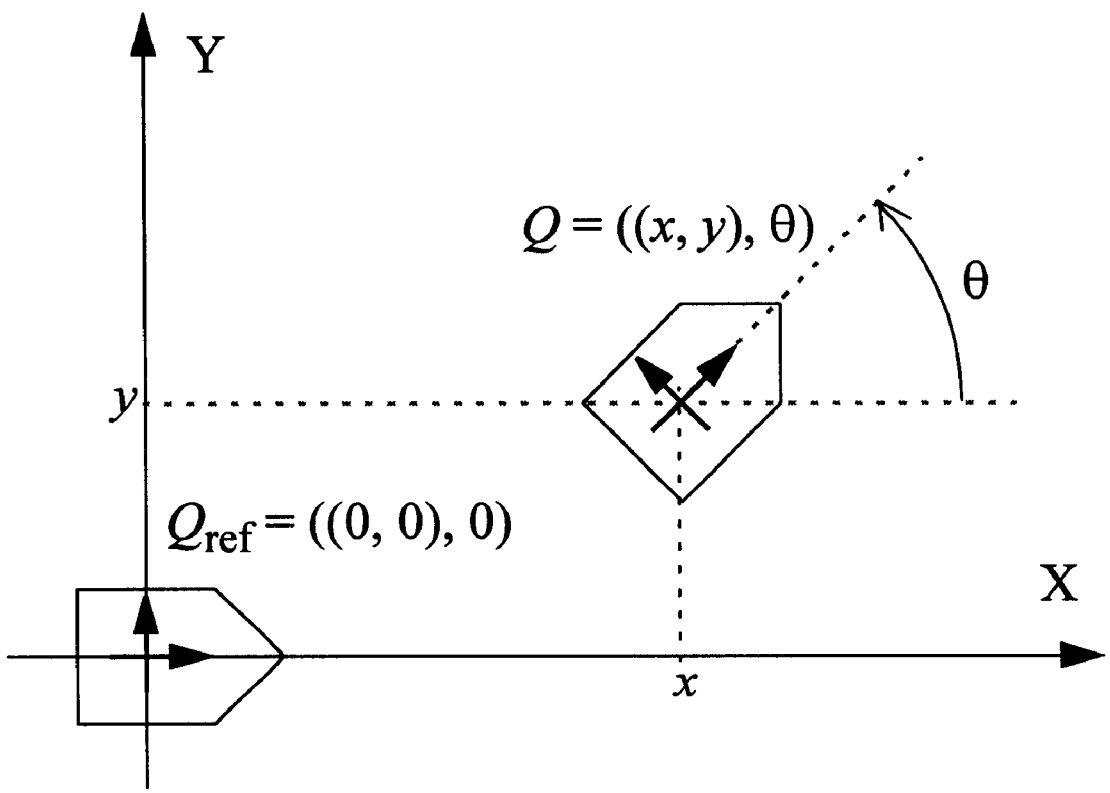
FIG. 1 shows a vehicle frame (position and orientation) $Q=(p,\theta)=((x, y), \theta)$ and the reference frame, $((0, 0), 0)$, of a manually-driven vehicle in the global frame.

To clearly define the position and orientation of a vehicle, we paste a local Cartesian frame on it (FIG. 1). In this specific embodiment, we assume the vehicle has one or two fixed wheel(s) where a fixed wheel is a wheel that cannot be steered. We also assume that if there are two fixed wheels, they are aligned on the same axle. There are at least three wheel architectures—a differential drive, a bicycle, and a car-like—that possess this property. The origin of the local frame is put on the axle of the fixed wheel(s) and its Y-axis is aligned to the axle. Then the local X-axis direction which is equal to the vehicle's heading orientation is perpendicular to the wheel axle.

A global frame is defined on the plane where the vehicle moves around. The local frame on the vehicle moves along the vehicle's motion. As shown in FIG. 1, the vehicle frame Q in the global frame is defined as $Q=(p, \theta)=((x, y), \theta)$ through the local frame. Here $p=(x, y)$ is the position of the local frame origin and $\theta$ the orientation of the local X-axis both measured in the global frame. Specifically, $Q_{ref}=((0, 0), 0)$ is called the reference frame.

Figure 2:
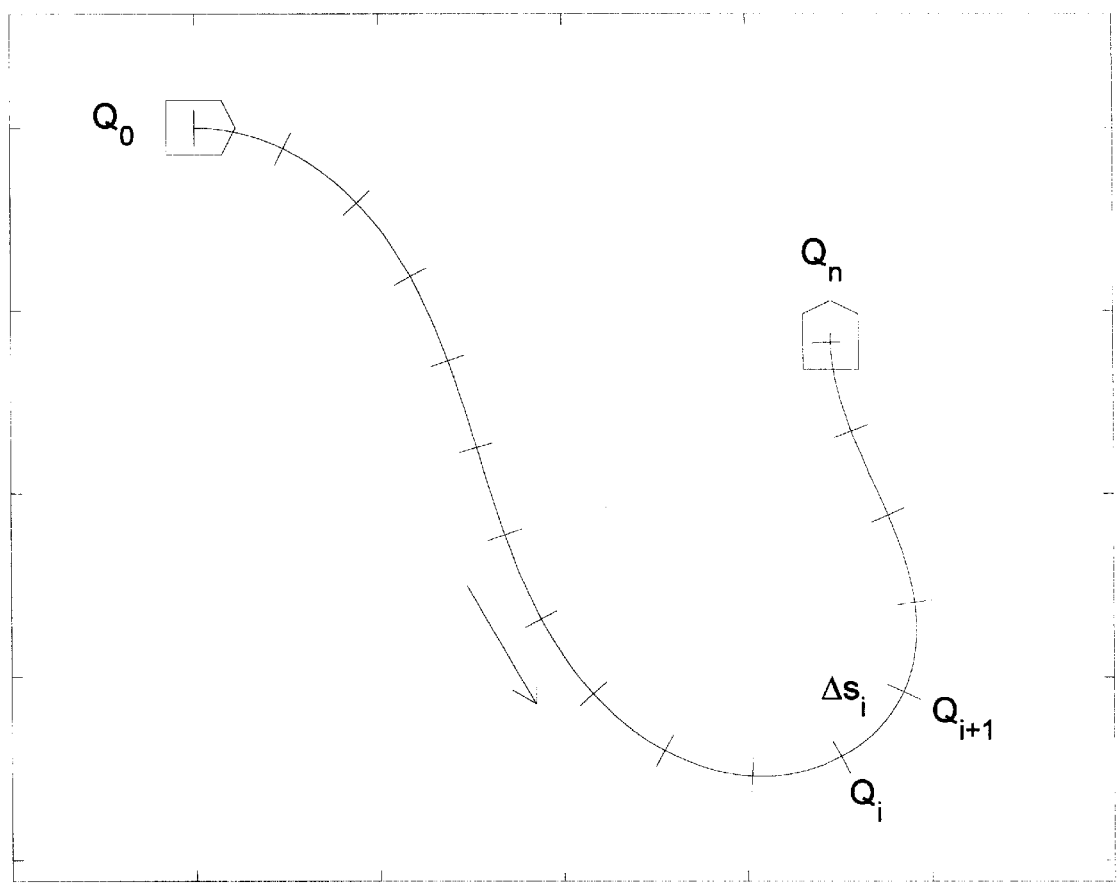
FIG. 2 shows a sample trajectory of a manually-driven vehicle, which is composed by short curves separated by vehicle frames.

The vehicle is manually driven starting from an initial vehicle frame $Q_0=(p_0, \theta_0)$ at time $t_0$. The initial frame is known to the vehicle. The vehicle frame $Q=(p, \theta)$ moves continuously with the vehicle, and the origin p of the vehicle frame generates a motion trajectory as shown in FIG. 2. This motion trajectory is discretely represented as a sequence ($Q_0, Q_1, \ldots, Q_i, Q_{i+1}, \ldots, Q_n$) of vehicle frames at motion execution times, $t_0, t_1, \ldots, t_i, t_{i+1}, \ldots, t_n$. Each vehicle frame $Q_i = (p_i, \theta_i)$ at time $t_i$ is shown by a tick in FIG. 2 (i=0, 1, ..., n). The tangential orientation to the trajectory at any point is equal to the X-axis orientation of the vehicle frame at the point. The tick at $p_i$ corresponds to the Y-axis of the vehicle frame $Q_i$. The vehicle is in the stop state at the initial and final frames, $Q_0$ and $Q_n$.

Now we demonstrate a method of computing a vehicle frame $Q_{i+1}$ from the previous frame $Q_i$ (i=0, 1, ..., n−1), assuming $Q_i$ is known. Notice that $Q_0$ is known. At the motion sampling time $t_{i+1}$, we assume that the vehicle can measure an incremental trajectory length $\Delta s_i$ and vehicle orientation change $\Delta \theta_i$ generated during the motion-execution interval $[t_i, t_{i+1}]$. The vehicle has a system architecture shown in FIG. 3, comprising of a main vehicle subsystem and a motion control subsystem. The motion control subsystem executes the motor-control and motion-measurement tasks, and reports the incremental trajectory length $\Delta s_i$ and vehicle orientation change $\Delta \theta_i$ to the main vehicle subsystem that executes the main algorithm described in this section. Detailed operations in the Motion Control Subsystem is described in Section [4]. The trajectory length $\Delta s_i$ is positive or negative. If $\Delta s_i < 0$, the vehicle has moved backwards manually. The vehicle orientation change $\Delta \theta_i$ is positive, negative, or equal to 0.

Noticing that the incremental vehicle trajectory from $Q_i$ to $Q_{i+1}$ in this period $[t_i, t_{i+1}]$ is normally small compared with the vehicle size, we assume that the curvature in the period is constant, which is equal to the average curvature $$\kappa_i = \Delta \theta_i / \Delta s_i.$$

Figure 4:
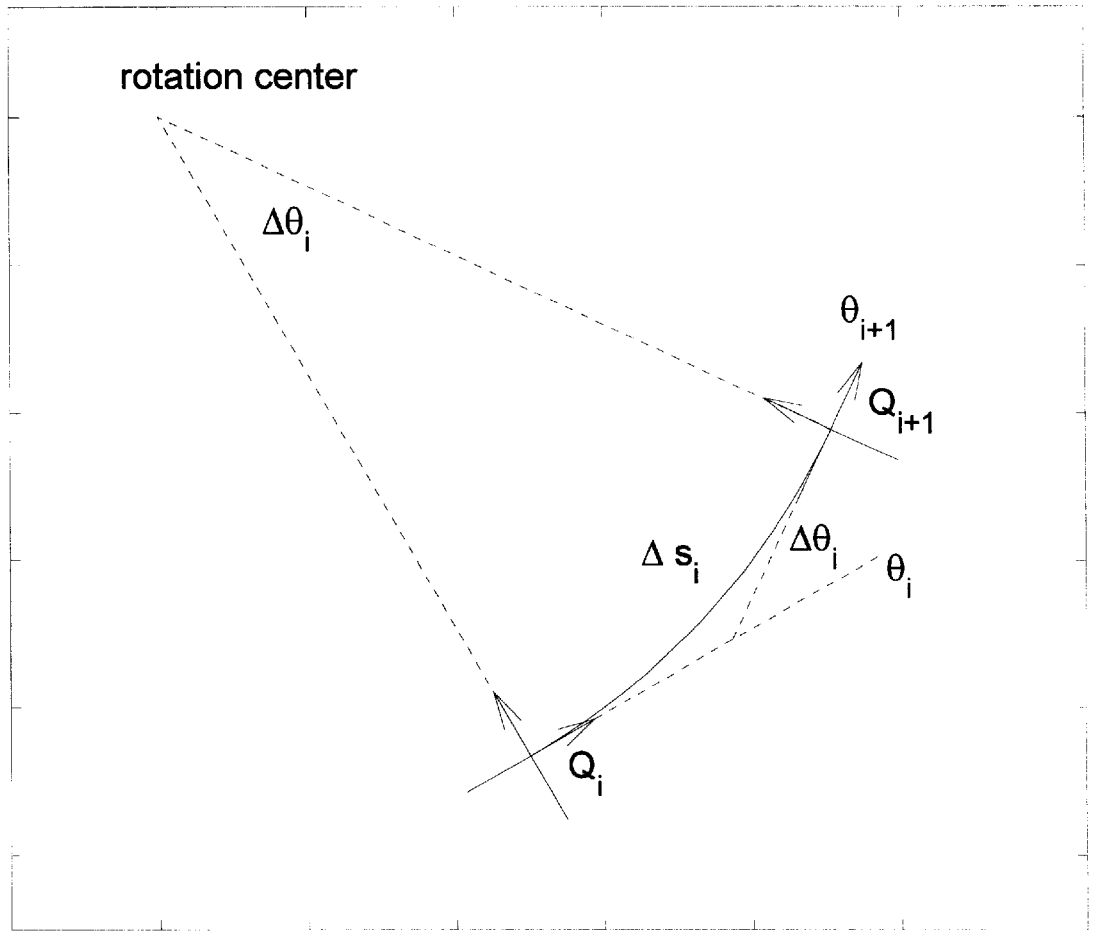
FIG. 4 shows an incremental transformation of a manually-driven vehicle characterized by a circular arc generated during a motion-execution interval.

Thus the incremental trajectory is a circular arc or a straight segment with this curvature $\kappa_i$ (FIG. 4). Namely the path segment is a short straight line if $\kappa_i = 0$, or a short circular arc otherwise. The circular arc is counterclockwise if $\kappa_i > 0$, and is clockwise if $\kappa_i < 0$.

Figure 5:
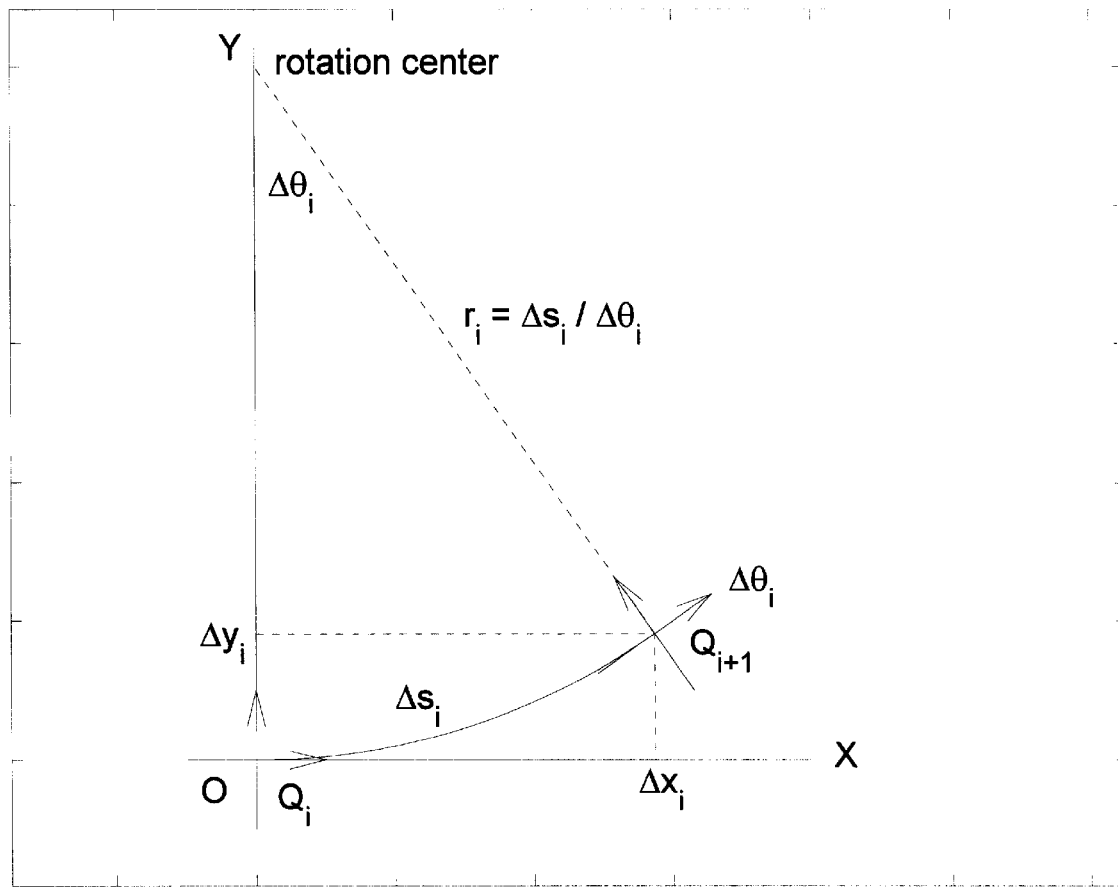
FIG. 5 is a figure made from FIG. 4 by moving the first frame $Q_i$ into the reference frame keeping the geometrical relation between the two frames unchanged. This figure also shows that the incremental transformation of a manually-driven vehicle is computed by the incremental trajectory length and vehicle orientation change.

FIG. 5 is a figure made from FIG. 4 by moving the first vehicle frame $Q_i$ into the reference frame ((0, 0), 0) keeping the geometrical relation between the two frames, $Q_i$ and $Q_{i+1}$, unchanged. FIGS. 4 and 5 demonstrate a specific case where the circular arc is counterclockwise with $\kappa_i > 0$. First we define an incremental transformation $$\Delta Q_i = ((\Delta x_i, \Delta y_i), \Delta \theta_i),$$

which is a transformation that transforms $Q_i$ into $Q_{i+1}$. Let us show how to evaluate this incremental transformation. If $\Delta \theta_i$ is not equal to zero, then the radius $r_i$ of the circular arc is $$r_i = 1/\kappa_i = \Delta s_i / \Delta \theta_i.$$

From FIG. 5, we can evaluate $$\Delta x_i = r_i \sin \Delta \theta_i = (\sin \Delta \theta_i / \Delta \theta_i) \Delta s_i$$

$$\Delta y_i = r_i (1 - \cos \Delta \theta_i) = ((1 - \cos \Delta \theta_i)/\Delta \theta_i) \Delta s_i.$$

On the other hand, if $\Delta \theta_i = 0$, the incremental trajectory is a straight segment and $$\Delta x_i = \Delta s_i$$

$$\Delta y_i = 0.$$

As a result, the incremental transformation $\Delta Q_i$ is obtained as $$\Delta Q_i = ((\Delta s_i, 0), 0)$$

$$\Delta Q_i = (((\sin \Delta \theta_i / \Delta \theta_i) \Delta s_i, ((1 - \cos \Delta \theta_i)/\Delta \theta_i) \Delta s_i), \Delta \theta_i)$$

if $$\Delta \theta_i = 0,$$

otherwise. This incremental transformation $\Delta Q_i$ transforms the vehicle frame $Q_i = ((x_i, y_i), \theta_i)$ into $Q_{i+1}$ using the following two-dimensional composition operator (*):

$$Q_{i+1} = Q_i * \Delta Q_i = ((x_i, y_i), \theta_i)*((\Delta x_i, \Delta y_i), \Delta \theta_i) = ((x_i + \Delta x_i \cos \theta_i - \Delta y_i \sin \theta_i, y_i + \Delta x_i \sin \theta_i + \Delta y_i \cos \theta_i), \theta_i + \Delta \theta_i).$$

The trajectory length $s_{i+1}$ from the start point $p_0$ to $p_{i+1}$ is computed recursively by $S_{i+1} = s_i + \Delta s_i$ with an initial condition, $s_0 = 0$.

[4] Incremental Motion Detection

Figure 3:
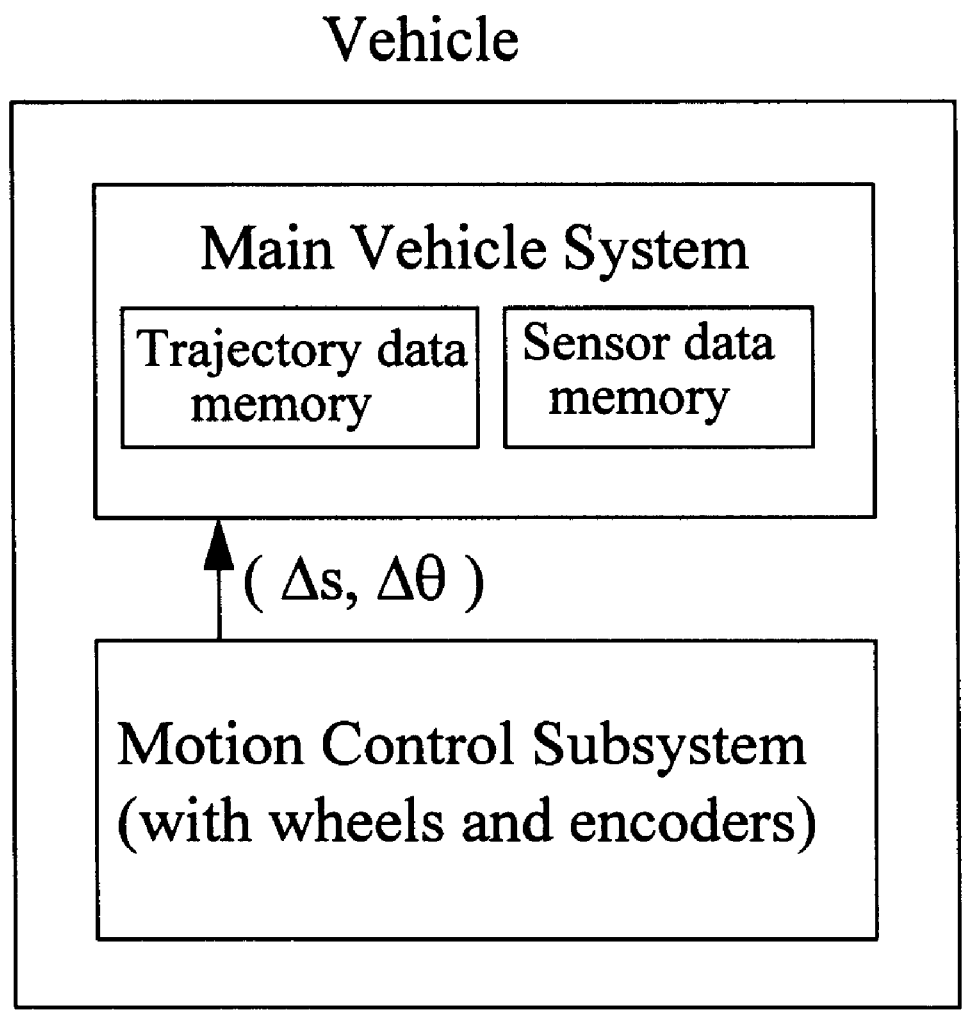
FIG. 3 is a block diagram of a manually-driven vehicle system that comprises of the main vehicle subsystem and the motion control subsystem.
Figure 6:
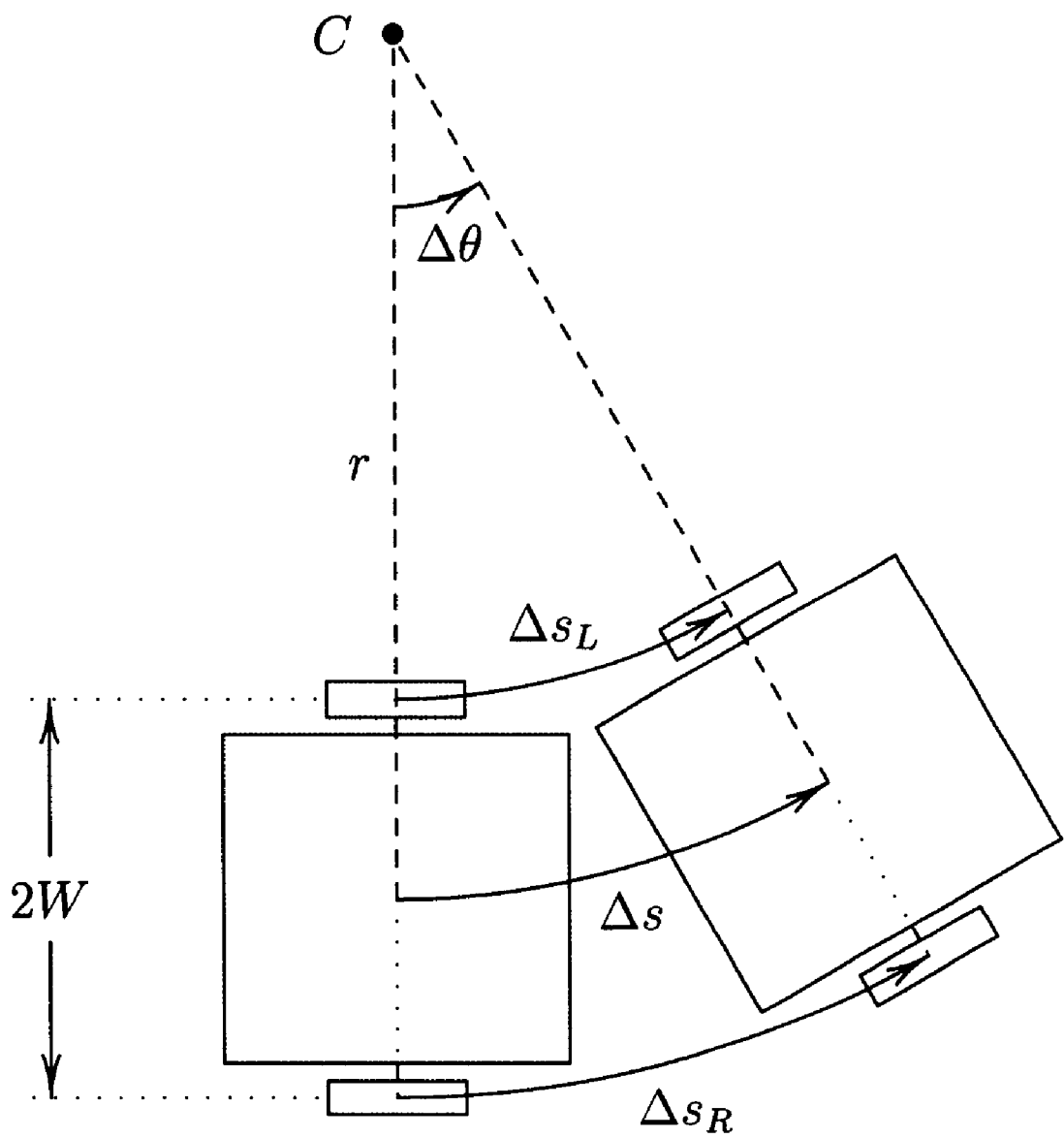
FIG. 6 shows that, in a manually-driven differential-drive vehicle, the incremental trajectory length and vehicle orientation change can be computed from the incremental moving distances at both wheels.

In this section, we describe how the motion control subsystem shown in FIG. 3 computes the incremental trajectory length $\Delta s_i$ and orientation change $\Delta \theta_i$. In this section only, we use $\Delta s$ and $\Delta \theta$ to denote $\Delta s_i$ and $\Delta \theta_i$ respectively for simplicity. As a sample wheel architecture for the vehicle, we take the differential-drive architecture, where two independently-driven wheels share the same axle as shown in FIG. 6. In this wheel architecture, the incremental rolling distances, $\Delta s_R$ and $\Delta s_L$ at the right and left wheels can be computed as follows, knowing the right and left motor-encoder pulse counts, $\Delta n_R$ and $\Delta n_L$, in the same motion-control-execution period, the total number of pulses N in one rotation of the encoder, the reduction-gear ratio G, and the wheel radius D:

$$\Delta s_R = (\Delta n_R / N)(1/G)\pi D$$

$$\Delta s_L = (\Delta n_L / N)(1/G)\pi D$$

Since we assume that the vehicle made a constant-crvature motion in this period, the three trajectories by the vehicle frame origin, the right wheel, and the left wheel are all concentric circular arcs, or are parallel line segments. First we assume that the curves are circular arcs; i.e., $\Delta \theta$ not equal to 0. Let r and 2W be the distance from the reference point to the circle center C and the distance between the two wheels respectively. From FIG. 6, $$\Delta s_R + \Delta s_L = (r+W)\Delta \theta + (r-W)\Delta \theta = 2r\Delta \theta = 2\Delta s,$$

$$\Delta s_R - \Delta s_L = (r+W)\Delta \theta - (r-W)\Delta \theta = 2W\Delta \theta.$$

Therefore, $$\Delta s = (\Delta s_R + \Delta s_L)/2, \tag{1}$$

$$\Delta \theta = (\Delta s_R - \Delta s_L)/(2W). \tag{2}$$

Thus, the pair ($\Delta s, \Delta \theta$) of the incremental trajectory length and vehicle orientation change are computed from the two values $\Delta s_R$ and $\Delta s_L$ using Equations (1) and (2) respectively. These equations are obviously correct even if the curves are straight segments, where $\Delta s_R = \Delta s_L$ and the curves are straight segments. This concludes the description of the task of a motion control subsystem.

Even if the vehicle uses other wheel architectures such as the tricycle or the car-lick architecture, the evaluation method of the two incremental-motion-related values is straightforward for an individual who is knowledgeable in this field.

[5] Motion-Data Recording

Now we are ready to record the motion data. The ith trajectory record $A_i$ must include the trajectory length and vehicle frame such as:

$A_i=(s_i, Q_i)$

This motion record $A_i$ is recorded in a memory at time $t_i$. A trajectory data M is a sequence $$M=(A_0, A_1, \ldots, A_i, A_{i+1}, \ldots, A_n)$$

of trajectory records.

[6] Motion Reproduction in Playing-Back Mode

The vehicle plays back the original motion using the trajectory data, $M=(A_0, A_1, \ldots, A_i, A_{i+1}, \ldots, A_n)$ in its play-back mode. A method of reproducing the recorded motion is found, for instance, in U.S. Pat. No. 6,134,486. In this filed invention, when a path description is given, a vehicle is steered using the positional error, directional error, and curvature error. Notice the information on position and orientation is included in the vehicle frame $Q_i$ in each motion record $A_i=(s_i, Q_i)$. Although each curvature $K_i$ is not directly contained in any motion record, it is calculated as $$\kappa_i \Delta\theta_i/\Delta s_i = (\theta_i - \theta_{i-1})/(s_i - s_{i-1}).$$

Thus the motion record M contains all the necessary and sufficient geometrical information to reproduce the manually generated trajectory.

[7] Sensor Data Recording

Furthermore, assume that a sensor or sensors are mounted on the vehicle that has the motion capacity described in the previous sections. An example of a sensor is an image sensor, a sonar, a laser range finder, or an infrared sensor. The relative position and orientation of a sensor on the vehicle should be generally described by a three-dimensional frame in the vehicle local frame rather than a two-dimensional one. For instance, the effects of sensors mounted at different heights may be different. Likewise, the effects of sensors mounted in a horizontal orientation and in a vertical one are obviously different.

A three-dimensional frame or transformation T is represented as $$T=((u, v, w), (\alpha, \phi, \psi)),$$

where u is X-coordinate, v Y-coordinate, w Z-coordinate, $\alpha$ yaw (rotation about Z-axis), $\phi$ pitch (rotation about Y-axis), and $\psi$ roll (rotation about X-axis). To deal with three-dimensional frames, a vertical Z-axis is added to the global frame with its origin on the ground. Namely, the set of points with z=0 is the ground surface. The two-dimensional vehicle frame $Q=((x, y), \theta)$ is changed into a three-dimensional one $Q'$:

$$Q'=((x, y, 0), (\theta, 0, 0)).$$

Figure 7:
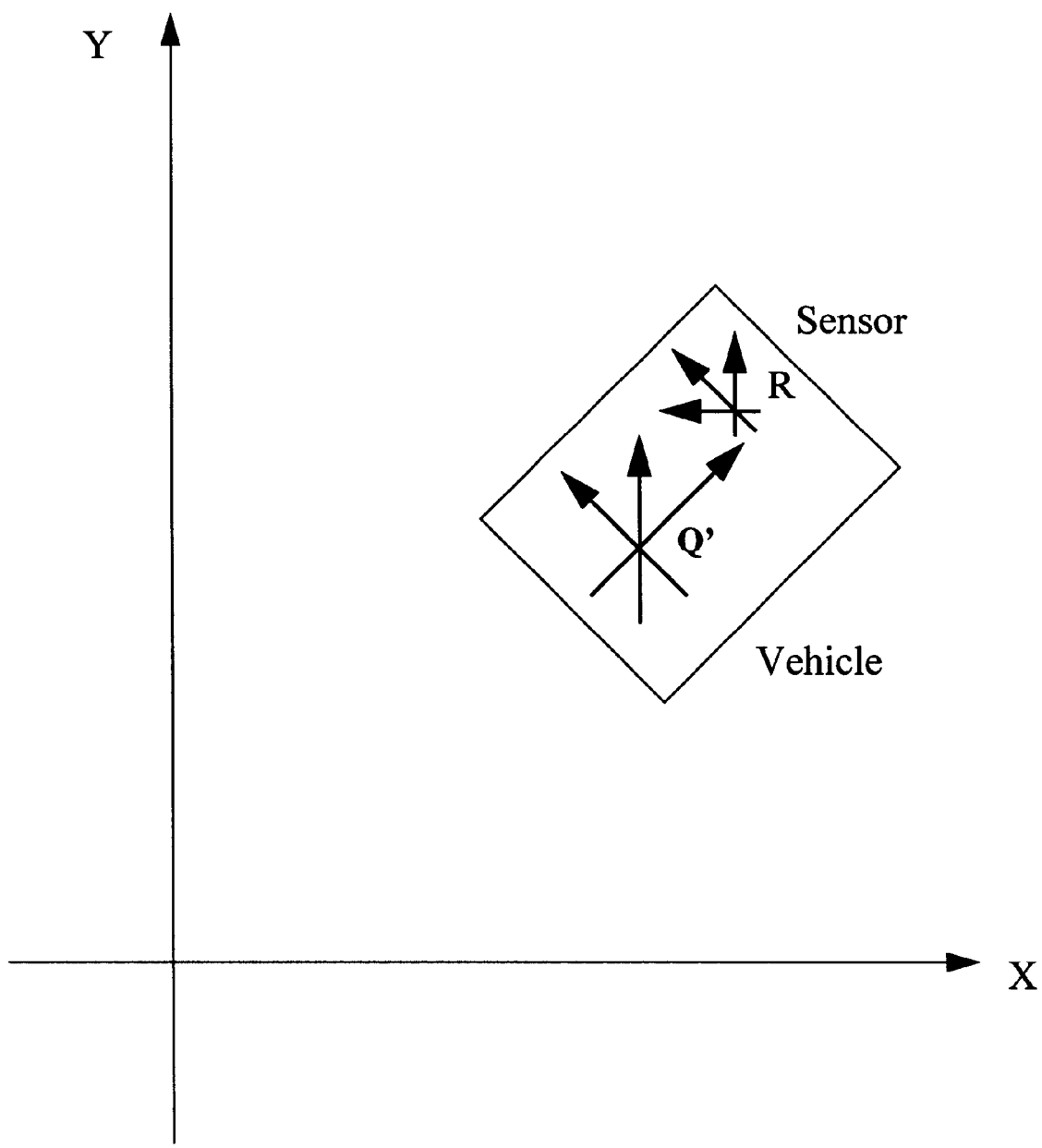
FIG. 7 shows that an on-board sensor is mounted on the manually-driven vehicle, where the vehicle frame is Q and the sensor frame local to the vehicle frame is R.

A vertical Z-axis is added also to the local vehicle frame and its origin is set at the ground level. Suppose a sensor is mounted on a vehicle (FIG. 7). Its three-dimensional sensor frame R local to the vehicle frame is represented as $$R=((a, b, c), (\alpha, \phi, \psi)).$$

The sensor's global frame S is obtained by the following three-dimensional composition:

$$S=Q'*R=((x, y, 0), (\theta, 0, 0))*((a, b, c),(\alpha, \phi, \psi))=((x+a \cos \theta - b \sin \theta, y+a \sin \theta + b \cos \theta, c), (\theta+\alpha, \phi, \psi))$$

Let U be the data collected by the sensor. For instance, if it is a sonar, the data is merely a range value d. If it is an image sensor, the data is a two-dimensional intensity information. If it is a proximity sensor, the data is only a one-bit on-off information. An example of a sensor record B is a quadruple $$B=(s, Q, S, U),$$

which comprises of the trajectory length s, the vehicle positional information Q, sensor positional information S, and sensed data U itself. A sensor data is a sequence $$P=(B_0, B_1, \ldots, B_i, B_{i+1}, \ldots, B_m)$$

of sensor records. Notice that the function execution intervals for motion and sensing are not necessarily the same, and hence, the number of trajectory records in a trajectory data M and the number of sensor records in a sensor data P generated in a single teaching session may not be equal. If more than one sensor is mounted on the vehicle, a multiple number of sensor data are obtained in a single teaching session.

[8] Range-Finder Data Recording

Figure 8:
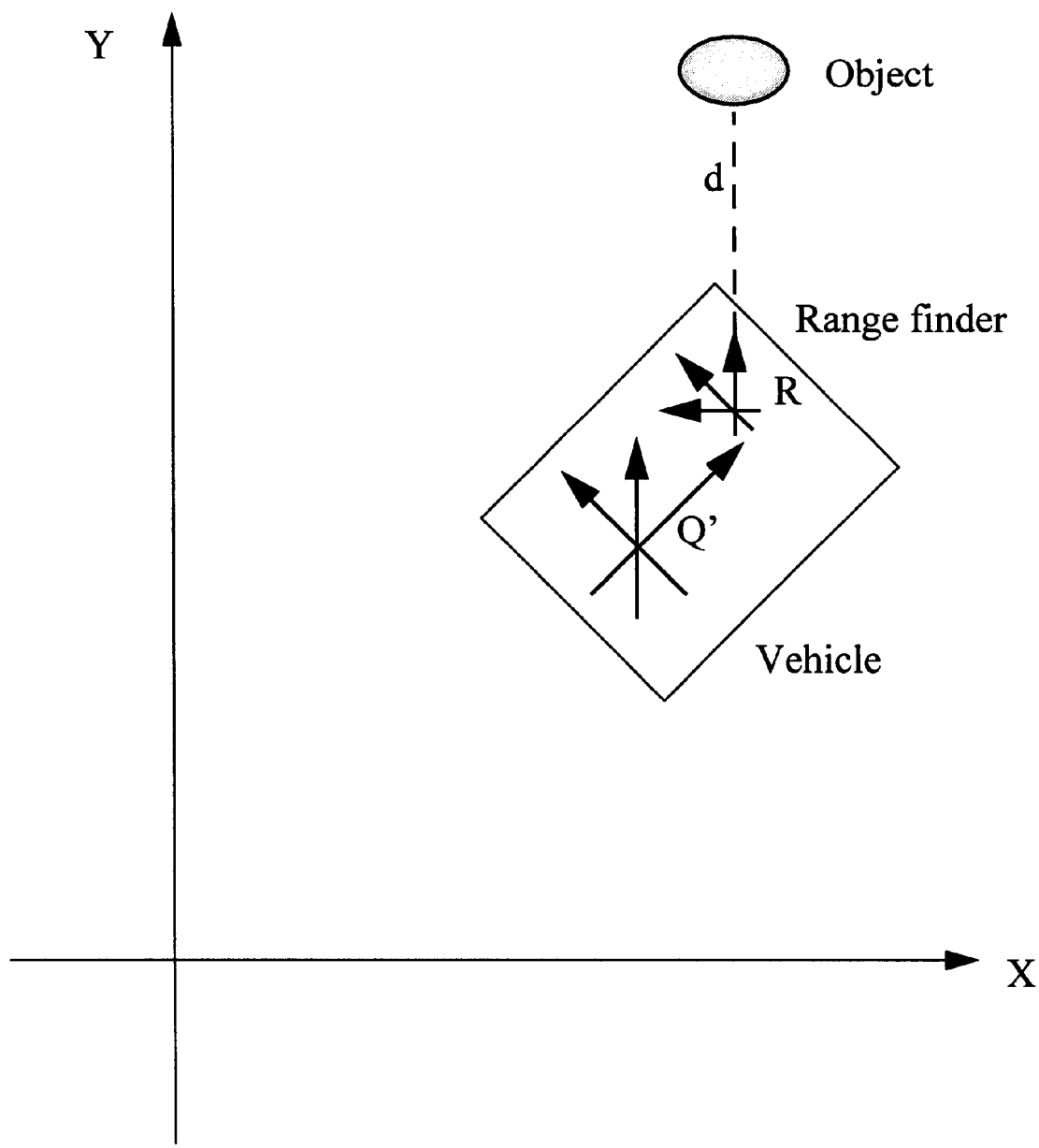
FIG. 8 shows that an on-board range finder is mounted on the manually-driven vehicle, where the vehicle frame is Q, the range-finder frame local to the vehicle frame is R, and the range to a detected object is d.

In this section, we consider an embodiment where the sensor described in Section [7] is a range finder. A sonar is one of typical range finders. Suppose a range finder is mounted on a vehicle (FIG. 8). Its three-dimensional sensor frame R local to the vehicle frame is $$R=((a, b, c), (\alpha, \phi, 0)),$$

as defined in the previous Section [7] except that the roll $\psi=0$, because of the nature of a range finder. The range finder's global frame S is obtained in a similar equation described in Section 7 as $$S=Q'*R=((x, y, 0), (\theta, 0, 0))*((a, b, c), (\alpha, \phi, 0))=((x+a \cos \theta - b \sin \theta, y+a \sin \theta+b \cos \theta, c), (\theta+\alpha, \phi, 0)).$$

If the range finder detects an object with a range of d, the object frame in the range-finder frame is $((d, 0, 0), (0, 0, 0))$. The best estimate V of the frame of the object in the global frame is obtained by the three-dimensional composition (FIG. 8):

$$V=S*((d, 0, 0), (0, 0, 0))=((x+a \cos \theta - b \sin \theta, y+a \sin \theta + b \cos \theta, c), (\theta+\alpha, \phi, 0))*((d, 0, 0), (0, 0, 0))=$$

$$((x+a \cos \theta - b \sin \theta + d \cos \theta \cos(\theta+\alpha), y+a \sin \theta + b \cos \theta + d \cos \theta \sin(\theta+\alpha), c+d \sin \phi), (\theta+\alpha, \phi, 0)).$$

This object frame is further added into the sensor record B $$B=(s, Q, S, U, V).$$

to obtain a range-finder record. A range-finder data is a sequence $$P=(B_0, B_1, \ldots, B_i, B_{i+1}, \ldots, B_m)$$

of range-finder records. If more than one range-finder is mounted on the vehicle, a multiple number of range-finder data are registered in one teaching session.

Figure 9:
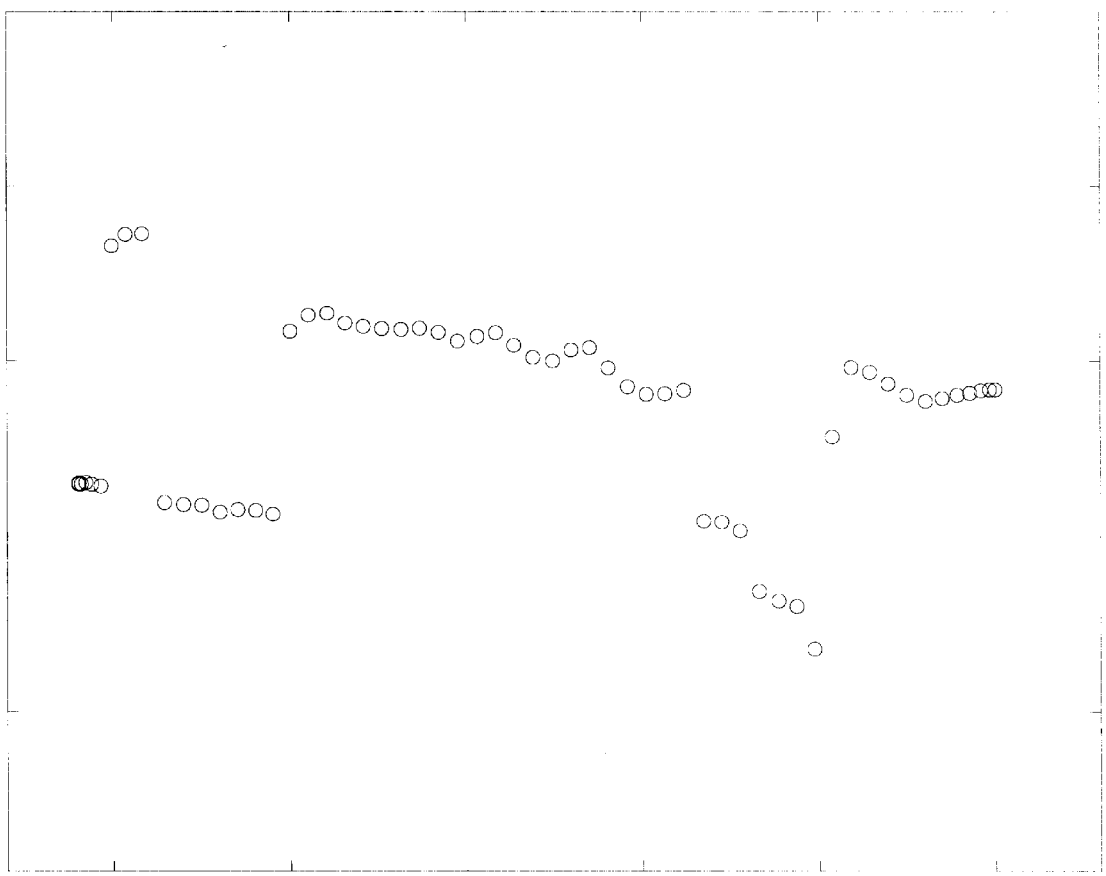
FIG. 9 is an example of a set of object points in a sonar data V. In this case, the sonar is mounted horizontally ($\phi=0$) on the manually-driven vehicle, the object data points are on a single plane.

FIG. 9 shows an example set of positions of the object frame V in a range-finder data. In this specific experiment, the elevation $\phi$ was 0 and z becomes constant. Therefore, all the points are on a single horizontal plane.

[9] Another Embodiment

As opposed to the typical embodiment of the invention stated in Section [1], this invention can be embodied by a vehicle that has only one mode, a teaching mode. In this vehicle, a motion data obtained may be used for purposes other than reproducing the motion on the same or a similar vehicle.

Also, with this vehicle, a sensor record obtained may not be used for playing back with the same vehicle. For instance, the sensor data generated by a human-driven operation may be utilized for the generation of an abstract geometrical map of the world, but not for the vehicle's unmanned navigation.

Obviously many modifications and variations of the present invention are possible in light of the above teachings. It is, therefore, to be understood that the present invention may be practiced within the scope of the claims other than as specifically described.

What I claim as invention is:

1. A method of recording trajectory data for a manually-driven vehicle that moves on a plane, comprising:

providing means for periodical motion function execution with a motion-execution interval $\Delta T$;

defining a global frame on said plane to describe a vehicle position $p=(x, y)$ and a vehicle orientation $\theta$ of said manually-driven vehicle;

denoting a pair $(p, \theta)=((x, y), \theta)$ of said vehicle position and said vehicle orientation as a vehicle frame Q;

denoting s as a trajectory length measured along a trajectory from a start position of said manually-driven vehicle;

providing means for detecting an incremental trajectory length $\Delta s$ during each motion-execution-interval $\Delta T$;

providing means for detecting a vehicle orientation change $\Delta \theta$ during each motion-execution interval $\Delta T$;

initializing said trajectory length s and said vehicle frame Q at an initial state; and executing a sequence of motion functions at every motion-execution interval $\Delta T$, comprising:

detecting said incremental trajectory length $\Delta s$;

detecting said vehicle orientation change $\Delta \theta$, computing an incremental transformation $\Delta Q$ using said incremental trajectory length $\Delta s$ and said vehicle orientation change $\Delta \theta$, updating said vehicle frame Q by composing said incremental transformation $\Delta Q$ to said vehicle frame Q;

updating said trajectory length s by adding $\Delta s$;

assembling a trajectory record A which comprises of said trajectory length s and said vehicle frame Q;

providing a memory which is able to store said trajectory record A; and storing said trajectory record A to said memory.

2. The method of claim 1, further comprising mounting a sensor on said manually-driven vehicle at a three-dimensional local sensor frame R in said vehicle frame;

providing means for periodical sensor-function execution with a sensor-execution interval $\Delta T'$; and executing a sequence of sensor functions at every sensor-execution interval $\Delta T'$, comprising:

converting said vehicle frame $Q=((x, y), \theta)$ into a three-dimensional vehicle frame $Q'=((x, y, 0), (\theta, 0, 0))$;

computing a global sensor frame S in said global frame by composing said three-dimensional vehicle frame Q' and said local sensor frame R;

collecting a sensor data U from said sensor;

assembling a sensor record B which comprises of said trajectory length s, said vehicle frame Q, said global sensor frame S, and said sensor data U;

providing a memory which is able to store said sensor record B; and storing said sensor record B to said memory.

3. The method of claim 1, further comprising mounting a range-finder on said manually-driven vehicle at a three-dimensional local range-finder frame R in said vehicle frame;

providing means for periodical range-finder function execution with a range-finder-execution interval of $\Delta T''$; and executing a sequence of range-finder functions at every range-finder-execution interval $\Delta T''$; comprising:

converting said vehicle frame $Q=((x, y), \theta)$ into a three-dimensional vehicle frame $Q'=((x, y, 0), (\theta, 0, 0))$;

computing a global range-finder frame S in said global frame by composing said three-dimensional vehicle frame Q' and said local range-finder frame R; collecting a range d to an object from said range finder;

computing an object frame V by composing said global range-finder frame S and a transformation $((d, 0, 0), (0, 0, 0))$;

assembling a range finder record B which comprises of said trajectory length s, said vehicle frame Q, said global range-finder frame S, said range d, and said object frame V;

providing a memory which is able to store said range-finder record B; and storing said range-finder record B to said memory.

* * * * *